March 6, 1928.  H. JUNKERS  1,661,182
SHOCK ABSORBING MEANS
Filed May 6, 1922   3 Sheets-Sheet 1

Inventor
Hugo Junkers
by [signature]
Attorney

March 6, 1928.  H. JUNKERS  1,661,182
SHOCK ABSORBING MEANS
Filed May 6, 1922  3 Sheets-Sheet 3
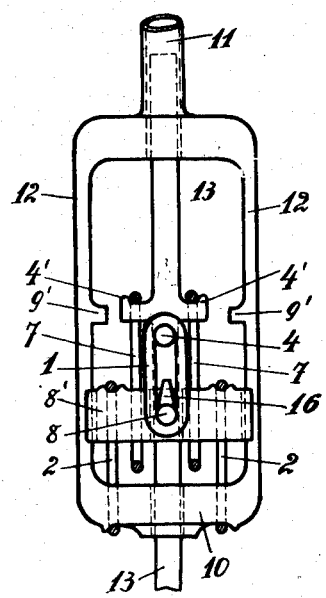
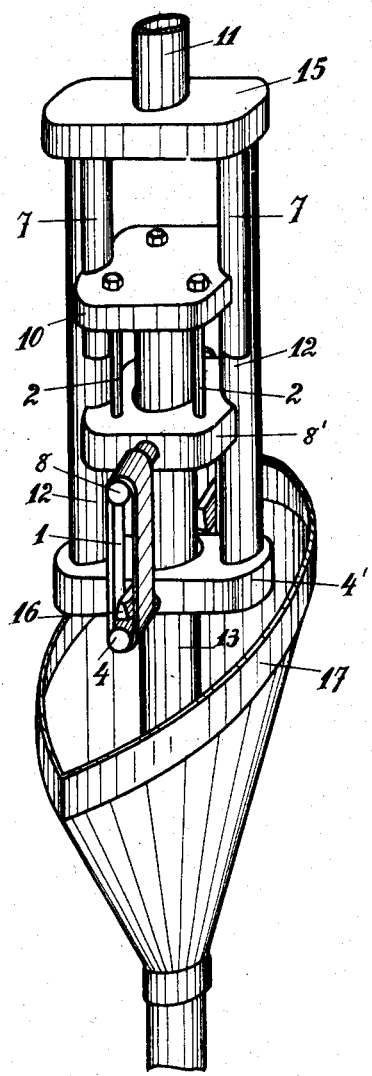
Inventor
Hugo Junkers
by *Attorney.*

Patented Mar. 6, 1928.

1,661,182

UNITED STATES PATENT OFFICE.

HUGO JUNKERS, OF DESSAU, GERMANY.

SHOCK-ABSORBING MEANS.

Application filed May 6, 1922, Serial No. 558,901, and in Germany May 6, 1921.

My invention has reference to means for the prevention of overstraining of structural members, and among other important uses and advantages it is intended for example to absorb the shocks and impacts produced by the sudden or bucking movements of vehicles, air craft and the like.

In parts of machinery which in their operation are exposed to heavy strains occasioned by impacts and shocks in regular sequence, the absorption of the shocks is ordinarily effected by springs. On the other hand, it has been suggested already to provide parts of machinery which are only rarely subjected to strains from shocks and impacts with special rupture members, by means of which the otherwise occurring excessive strains are kept away from the parts to be protected. In the case of absorption of the strains by spring action the capacity for operation after the absorption of the shocks is retained, while in the case last mentioned it is interrupted by the rupture member.

It is an object of my invention to make provision for the absorption of shocks and similar excessive forces by a member capable of deformation, and which without interrupting the cohesion of the material converts the excessive strains into deformation work without the occurrence of excessive stresses in the other parts of the structure to be protected. The member to be protected therefore permanently retains the cohesion of its parts and is secured from rupture, and it is an important additional advantage of the means employed for this purpose that the weight of the part for the absorption of the deformable member is very low.

In a preferred form of embodiment of the invention the deformable members are arranged in series or in parallel connection with spring absorption means.

The invention is particularly of importance in those cases where only exceptionally occurring high strains are to be absorbed by structural elements of as low a weight as possible as is particularly required with vehicles, and in this connection the invention is of importance as applied to the carriage of air craft.

The invention is shown in various forms of embodiment by way of example upon the accompanying drawings, in which Figs. 1 to 6 illustrate somewhat diagrammatically various arrangements of the operating members.

Figure 2:
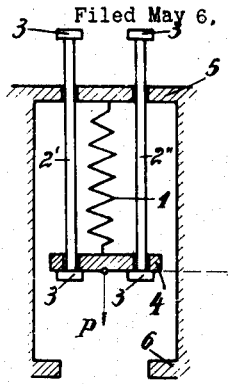

Figure 2ª is a fragmentary side elevation of the supporting carriage for a flying machine, having applied thereto a form of the invention.

Fig. 7 is a form of construction embodying my invention as applied to the carriage of a flying machine, and Fig. 8 is a perspective view of another modified form suitable for use in connection with carriages of flying machines.

Figure 1:
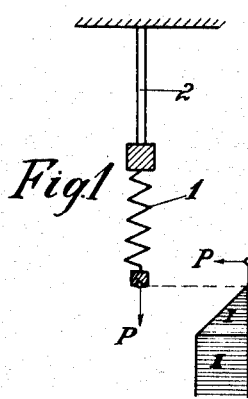

Referring first to Fig. 1 a rod shaped extensible member 2 is connected in series with a spring 1 intermediate the power transmitting parts. The ratio of absorption of power of the two parts is adjusted in such a manner that, until the maximum admissible straining of the spring is obtained the extensible member 2 is not subjected to any appreciable elastic deformation, while thereafter it commences to be extended or elongated; the tensional force is thereby hardly appreciably increased, and upon reaching the yield point of the extensible member 2 the tensional force is not increased at all, but work is absorbed by elongation or extension, while the power remains the same or is somewhat reduced. The power-distance diagram visible below the figures illustrates the procedure (towards the left is plotted the particular value for the force P evolved by this arrangement, and downwards the distance S of the point of action of the force is shown which is the sum of the paths of stretching). The section I corresponds to the work yieldingly absorbed by the spring 1, and the section II corresponds to the additional work subsequently unyieldingly absorbed by the extensible member 2.

In accordance with Fig. 2 two extensible members 2′, 2″ are arranged in parallel connection with a spring 1, and in such a manner that the head ends 3 of the extensible members 2′, 2″ are compensated between the movable abutment 4 and the rigid abutment 5 only after the spring 1 has passed through the greater portion of its admissible elongation. An additional elongation of the spring 1 is accompanied by the extension of the extensible members 2′, 2″. An excessive straining of the spring may occur, but a particularly high absorption of work is made possible. In this form of construction the stationary abutment 5 of the spring is connected with stops 6 which compensate the strain on the movable spring abutment 4 after the parts have moved through the highest admissible elongation in order to avoid complete rupture, until the particular parts of the structure have to be sacrificed if, after this procedure, the operation could not be resumed. The diagram attached to this figure illustrates in the manner before outlined the work absorption areas.

A form of construction based on this arrangement and particularly applicable in connection with carriages for flying machines may, for instance, be obtained as shown in Fig. 2ª: The usual spring loops 20 obtained by the winding of rubber bands or bands of spiral wire are surrounded by additional loops 21 of highly extensible metal (such as copper wire, for instance), the latter being so loosely arranged that they are only strained upon a very great increase of the strain on the springs. Additional wire loops 22 of substantially unyielding material (steel wire), and still more loosely arranged, would then correspond to the relatively stationary stops 5, 6.

Figure 3:
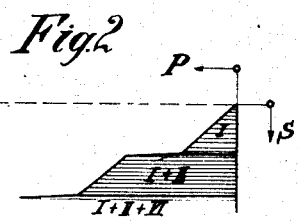
Figure 3:
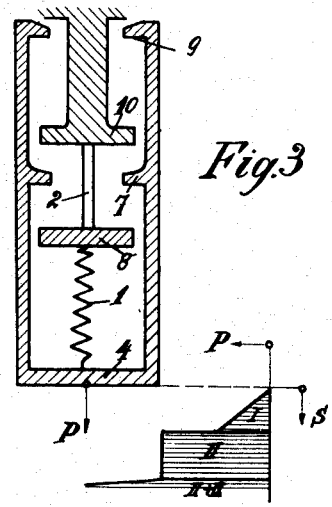

In Fig. 3 an arrangement is shown in which an extensible member 2 is also arranged in series with a spring 1. To one of the spring abutments 4 a stop 7 is connected which may be supportingly engaged with the spring-pressed cross bar 8, and an additional stop 9 adapted to become supportingly engaged with the cross bar 10 containing the extensible member. In this arrangement the action of the spring after its admissible elongation is absorbed by the stop 7, whereupon the extensible member 2 continues its elongation, and is finally compensated after having performed its admissible extension, by the stop 9.

Figure 4:
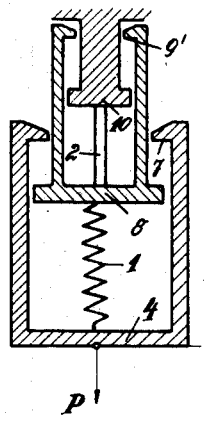

In Fig. 4 the extensible body 2 and the spring 1 are arranged in series similar to Fig. 3, the spring abutment 4 being provided with a stop 7 which is compensated by the spring-pressed cross bar 8. Additional stops 9' are provided on the cross bar 8 to become supportingly engaged with the cross bar 10 of the extensible member 2. In this arrangement the action takes place in accordance with the diagram, and is essentially the same as outlined with reference to Fig. 3, but the safety is increased inasmuch as with a premature breaking of the extensible member 2, which may occur in consequence of deficient material or from other causes, at least the member (the spring) not yet broken is operated to its full work absorbing extent.

Figure 5:
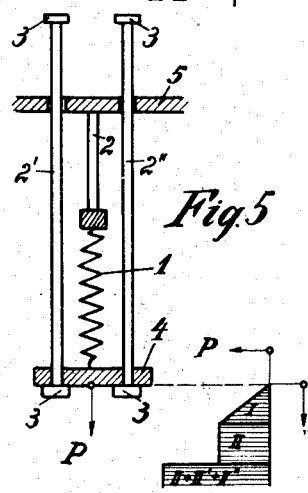

In Fig. 5 an extensible member 2 is arranged in series with a spring 1, and two additional extensible members 2' and 2" are connected in parallel with this combination of parts in such a manner that the heads 3 are compensated between the abutments 4 and 5 only after the parts 1 and 2 first mentioned have moved through the admissible elongation distance, so that thereupon the further absorption of the working strain is effected by means of these extensible members 2', 2".

Figure 6:
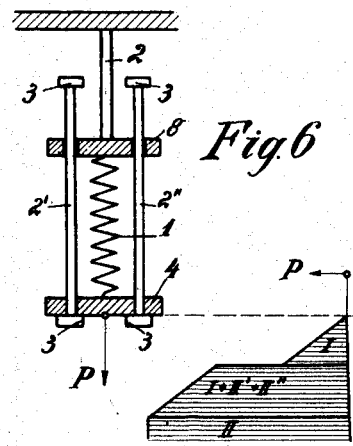
Figure 2A:
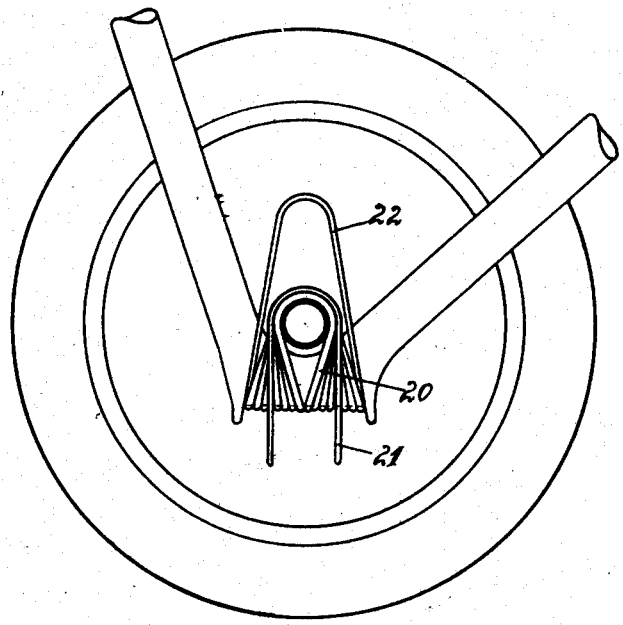

In accordance with the arrangement illustrated in Fig. 6 an extensible body 2 is arranged in series with a spring 1, while two additional extensible bodies 2', 2" are arranged in parallel with the spring 1, their heads 3 resting upon the connecting cross bar 8 after having moved through the distance of the admissible elongation of the spring. The relative proportions of the different parts are selected in such a manner that the spring 1 is first elongated, whereupon the extension of the spring 1 is continued together with that of the extensible bodies 2', 2", before the rupture takes place the extension of the body 2 arranged in series therewith occurs, as appears from the diagram. In this arrangement I preferably make use of relatively rigid stopping means which, similar to the stops 7 and 9' (Fig. 4) prevent the complete breaking of the spring 1 and of the extensible members 2', 2", parallel thereto, or of the extensible body 2.

Fig. 7 illustrates the application of the principle outlined in Fig. 4, to a tie rod of a flying machine carriage. The tie rod is constituted by a tube 11 with fork shaped frame 12 in which another tube 13 is arranged for longitudinal displacement. The tube 13 has two lateral studs 4 acting as spring abutments. Two other studs 8 represent the spring acting cross bar, and in conjunction with the studs 4 they serve for the mounting of the spring 1 constituted by loops of rubber band or of coiled wire, and wound upon the studs. The cross bar 8 is guided in the fork-shaped tube 12 by means of the cross head 8', and it is retained in its position with relation to the lower transverse section 10 of the fork-shaped frame 12 by two extensible bodies 2 arranged in series with the spring. Two bands or wire loops 7 are, moreover, placed with play between the cross bar 8 and the lateral projecting studs 4' of the tube 13 in such a manner that they are capable of being placed under tension only after the spring 1 has performed its admissible elongation, thereby preventing further extension of said spring, that is to say, they will then operate as stops. Two additional stopping lugs 9' are provided upon the fork 12 in such a manner as to compensate the crosshead 8' with cross bar 8 after the performing of the admissible extension of the member 2.

The system operates by first causing the spring 1 to act in the ordinary manner in case of shocks occurring on starting and landing, and if this shock is too heavy to be absorbed by the spring, it will be compensated by the wire loops and together with these it transmits the strain to the extensible members 2 which thereupon unyieldingly absorb the continued force of the shock, until they are likewise compensated by engagement with the stops 9'. If this should not yet be sufficient to absorb the impact, the rupture of one of the portions of the tie rod will become inevitable.

If it is desired to still prevent rupture in this case also, and to provide for a further absorption of the working strain, the stopping loops 7, instead of being made from relatively rigid members such as steel wire, should also be formed as extensible members, such as copper wires; and in such case these parts will also admit of a further unyielding absorption of working force in accordance with the diagram of Fig. 6, by the extension of these members 7 (which now correspond to the bodies 2', 2'' in Fig. 6) with the simultaneous further loading of the spring 1 to the limit of stroke corresponding to the particular sections of the tie rod. Rubber blocks 16 mounted upon the cross bar 8 serve for the absorption of the recoil in the case of a sudden unloading of the spring.

In Fig. 8 a tie rod section 11 is provided with a fork shaped section 12, the lower portion of which carries a transverse connecting member 4', another tie rod section 13 being guided therein so as to admit of longitudinal displacement. Between the cross bar 4 and a cross head 8' which is freely displaceable and guided between the legs 12 of the fork shaped frame, rubber spring loops 1 are wound upon the studs 4 and 8 which spring may also be arranged in several layers above and side by side of each other. Between the cross head 8' and another cross head 10 secured to the section 13 of the tie rod extensible bodies 2 are arranged represented by four rods which are secured with their ends in the cross heads 8', 10 somewhat in the manner of the tearing rods employed in testing of the strength of material. For the purpose of compensation of strain upon the spring actuated cross head 8' sleeves 7 are mounted upon the legs of the fork 12, and for the compensation of the cross head 10 the upper connecting piece 15 of the fork tube 12 is provided. Upon the studs 4 of the cross head 4' rubber blocks 16 are mounted which serve for the absorption of the recoil produced by the absorption of shock by the spring 1. A stream lined sheet metal casing 17, part of which only is shown in the drawing surrounds the entire device as a protection against outer influences and with a view of reducing the air resistance.

The operation is as follows: An impact or shock is transmitted from the tube 13 by the cross head 10 to the extensible members 2, and thence to the spring member 1 and is yieldingly absorbed. If the force of the shock or impact is in excess of the absorbing capacity of the spring, the excess is absorbed by the cross head 8' bearing upon the ends of the sleeves 7, and the extensible bodies 2 absorb the further working force. If it be desired to provide for an absorption of working force also in the case of a premature rupture of the extensible body by the spring member 1, two extensible bodies 2 should, for example, be replaced by rigid stopping members similar to the stops 9' of Figs. 4 and 7. The shock occurring by the sudden unloading as a result of the sudden contraction of the spring 1, such as occurs upon jumping or starting of the aircraft such shocks being downwardly directed into the tie rod 13, is absorbed by being transmitted to the cross head 8' by the extensible rods 2 secured so as to be proof against being crushed, and from this member 8' it is yieldingly transmitted by the rubber blocks 16 to the cross head 4', the forked tube 12 and the tubular tie rod 11. Also in this case the extensible rods are adapted to absorb deforming forces in view of their being mounted in a manner favorable for the transmission of compressing forces. This is particularly of importance in the case of heavy vehicles requiring strong spring actuated power absorbing means.

While I have shown various means of embodiment of the general principle hereuntofore outlined, it is obvious that my invention is capable of a great variety of other embodiments, so as to adapt itself to the various conditions of use and without deviating from the scope of the claims.

I claim:

1. The combination with two relatively movable parts, of a shock absorbing device comprising a permanently deformable substantially inelastic member.

2. The combination with two relatively movable parts, of a shock absorbing device comprising an elastic member and a permanently deformable substantially inelastic member arranged in series with said elastic member.

3. The combination with two relatively movable parts, of a shock absorbing device comprising a spring and a permanently deformable, substantially inelastic member.

4. The combination with two relatively movable parts, of a shock absorbing device comprising a spring and a permanently deformable, substantially inelastic metal member.

5. Shock absorbing device comprising an elastic member and a permanently deformable, substantially inelastic member arranged in series to said elastic member and means for subjecting said inelastic member to strain only when said elastic member is highly strained.

6. Shock absorbing device comprising an elastic member and a permanently deformable, substantially inelastic member and means for limiting the deformation of said inelastic member to a predetermined value.

7. Shock absorbing device comprising an elastic and a permanently deformable, substantially inelastic member and a rigid abutment arranged in the path of one of said members.

8. Shock absorbing device comprising an elastic and a permanently deformable, substantially inelastic member and a rigid abutment arranged in the path of said elastic member.

9. Shock absorbing device comprising an elastic member and an expansible metal rod arranged for tensional stress.

10. The combination with two relatively movable parts, of a shock absorbing device comprising an elastic member and a copper member operatively arranged for tensional stress.

11. Shock absorbing device comprising an elastic member, an expansible metal rod arranged for tensional stress and an abutment for said rod, the length of said rod being such that it will come in operative contact with said abutment only when the operative length of said elastic member is materially changed.

12. Shock absorbing device comprising a plurality of permanently deformable, substantially inelastic members and elastic members operatively connected and power transmission means operatively related to said members.

13. Shock absorbing device comprising a series of abutments spaced from each other, permanently deformable, substantially inelastic members in sliding contact with said abutments, elastic members operatively related to said abutments and stops on said inelastic members adapted to limit the movement of said members relatively to said abutments.

14. Shock absorbing device comprising an elastic member and two deformable, substantially inelastic members, all said members being arranged for series operation.

In testimony whereof I affix my signature.

HUGO JUNKERS.